United States Patent [19]

Suzuki et al.

[11] 4,232,885
[45] Nov. 11, 1980

[54] PASSIVE SEATBELT SYSTEM

[75] Inventors: Ichiro Suzuki, Nagoya; Masanao Motonami; Hisashi Ogawa, both of Toyota, all of Japan

[73] Assignee: Toyota Jidosha Kogyo Kabushiki Kaisha, Toyota, Japan

[21] Appl. No.: 17,943

[22] Filed: Mar. 6, 1979

[30] Foreign Application Priority Data

Aug. 16, 1978 [JP] Japan .............................. 53/112188

[51] Int. Cl.³ .......................................... B60R 21/10
[52] U.S. Cl. ...................................... 280/804; 16/91; 16/96 R; 74/30; 180/268; 297/469
[58] Field of Search ............... 280/804, 802, 801, 808; 297/482, 483, 469; 180/270, 268; 16/95 R, 96 R, 91; 74/30, 29

[56] References Cited

U.S. PATENT DOCUMENTS

| 2,671,285 | 3/1954 | Benschoten | 74/29 |
| 3,074,356 | 1/1963 | Parker | 16/95 R |
| 3,874,244 | 4/1975 | Rasmussen | 74/30 |
| 3,882,955 | 5/1975 | Kaneko | 280/804 |
| 3,889,971 | 6/1975 | Kazaoka | 280/804 |
| 3,968,978 | 7/1976 | Hayashi | 280/804 |
| 4,061,365 | 12/1977 | Nagano | 280/804 |

FOREIGN PATENT DOCUMENTS

2445688  4/1976  Fed. Rep. of Germany .......... 280/804

Primary Examiner—John P. Silverstrim
Attorney, Agent, or Firm—Koda and Androlia

[57] ABSTRACT

A passive seatbelt system including a passenger restrictive seatbelt of which an inner end is attached to a roller mechanism fastened to a center of the motor vehicle and an outer end which is fastened to a moving plate, the moving plate is fastened to a roof side of the motor vehicle and constrained to forward and rearward motion, a narrow belt is attached to the moving plate at one end and to a winding roller located to the rear of the roof side for winding up the narrow belt, the narrow belt and winding roller being arranged and configured such that it permits free unwinding to accommodate passengers of different physique except at times of a vehicular emergency wherein the unwinding of the narrow belt is stopped by an emergency locking retractor.

8 Claims, 13 Drawing Figures

FIG_6

FIG_7

FIG_8

FIG_9

FIG_10

FIG_12

FIG_13

PASSIVE SEATBELT SYSTEM

BACKGROUND OF THE INVENTION

1. Field of the Invention

This invention relates to passive seatbelt systems and more particularly to passive seatbelt systems which automatically fasten a restrictive webbing about a passenger after the passenger has seated himself in the motor vehicle.

2. Prior Art

Seatbelt devices are designed to protect passengers in a motor vehicle by holding them with restrictive seatbelts during vehicular emergencies and preventing collision with dangerous objects within the motor vehicle to thereby greatly increase the safety of such passengers. However, because of the complexity, etc. fastening such seatbelts, the percentage of use is very low. For this reason, passive seatbelts which automatically fasten themselves about the passenger after the passenger has been seated, have been proposed. These passive seatbelt devices or systems consist of a restrictive seatbelt whose outer end is fastened on the door or roof side and is movable forward and backward. This outer end is connected to and moved by a motor connected to the vehicle's power supply and may be moved forward or backward to cause the seatbelt to approach or move away from the passenger seat.

Therefore, after the passenger seats himself, the seatbelt would automatically move rearward to fasten itself and to close the gap between the seatbelt and the seat.

However, in such present passive seatbelt systems, since the stopping point of the outer end of the seatbelt is a constant, it is not possible for the seatbelt device to fit passengers of different physiques and therefore the passenger's freedom is restricted after the seatbelt is fastened and the passenger is uncomfortable.

SUMMARY OF THE INVENTION

Accordingly, it is the general object of the present invention to provide a passive seatbelt system which automatically fastens the seatbelt appropriately about passengers of different physiques after the passengers enter the vehicle.

It is still another object of the present invention to provide a passive seatbelt system which guarantees the safety of the passenger by restricting them during vehicular emergencies but does not interfere with the passenger's freedom under normal vehicular operating conditions.

In keeping with the principles of the present invention, the objects are accomplished by a unique passive seatbelt system including a passenger restrictive seatbelt of which an inner end is attached to a roller mechanism fastened to a center of the motor vehicle and an outer end which is fastened to a moving plate, the moving plate is fastened to a roof side of the motor vehicle and constrained to forward and rearward motion, a narrow belt is attached to the moving plate at one end and to a winding roller located to the rear of the roof side for winding up the narrow belt, the narrow belt winding roller being arranged and configured such that it permits free unwinding to accomodate passengers of different physique except at times of a vehicular emergency wherein the unwinding of the narrow belt is stopped by an emergency locking retractor.

BRIEF DESCRIPTION OF THE DRAWINGS

The above mentioned features and objects of the present invention will become more apparent with reference to the following description taken in conjunction with the accompanying drawings wherein like reference numerals denote like elements, and in which:

FIG. 2 is a front view of the vehicle of FIG. 1;

FIG. 8 is a close-up of a front pillar showing a sprocket wheel;

FIG. 9 is a cross sectional along the line IX—IX of FIG. 8;

DETAILED DESCRIPTION OF THE INVENTION

Figure 1:
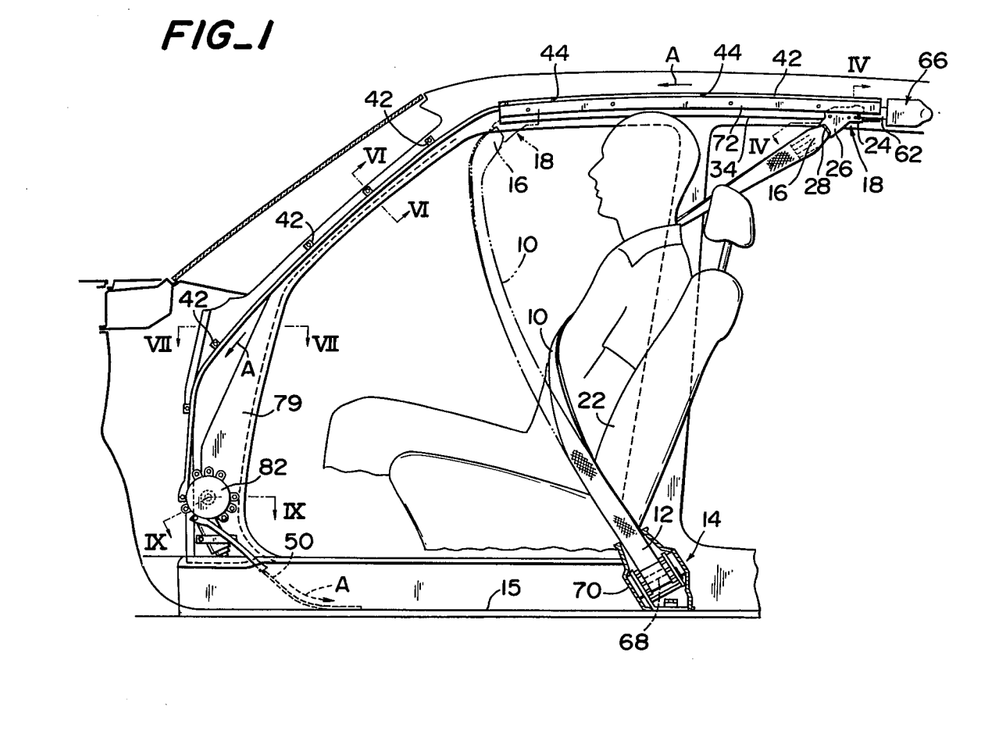
FIG. 1 is a side view illustrating one embodiment of a passive seatbelt system in accordance with the teachings of the present invention.

Referring more particularly to the drawings, shown in FIG. 1 is a first embodiment of a passive seatbelt system in accordance with the teachings of the present invention. In FIGS. 1 and 2, the inner end 12 of the passenger restraining belt 10 is wound onto a self-winding roller 14 which is fastened to the vehicle floor 15. The winding roller 14 is fastened to the center of the vehicle facing left and right.

Figure 3:
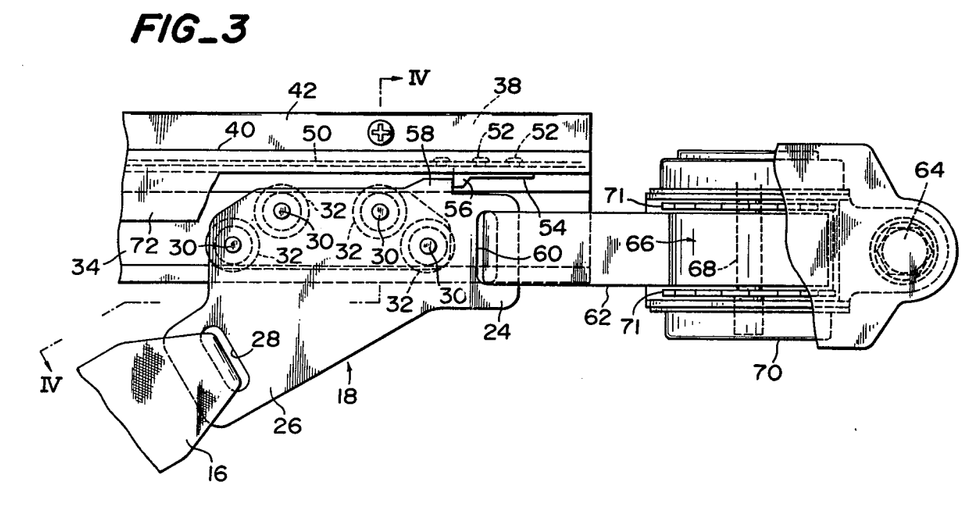
FIG. 3 is an expanded view of a part of FIG. 1.
Figures 4, 5:
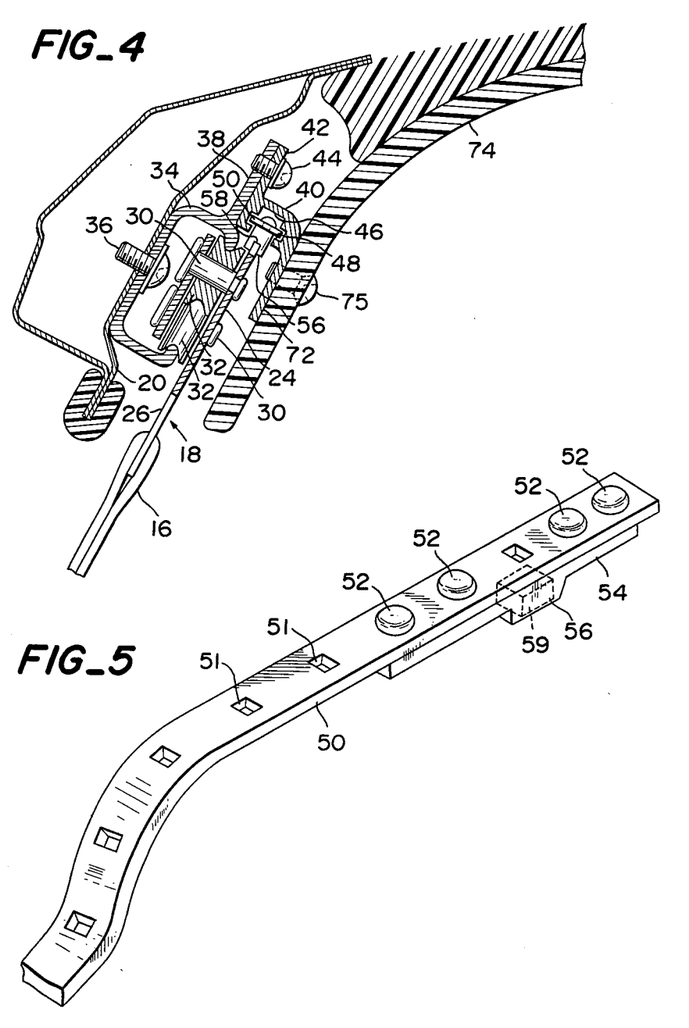
FIG. 4 is a cross sectional along the line IV—IV of FIG. 3.
FIG. 5 is a close-up of a thick tape.

The outer end 16 of the belt 10 is fastened to a truck 18 which is fastened to the roof side member 20 and may be moved forward and backward. By this forward and backward motion, the belt 10 approaches and moves away from the passenger seat 22. Therefore, a passenger seated in the seat 22 may be automatically fastened in or released by the belt 10. The truck 18, as shown in FIGS. 3 and 4, includes a moving plate 20 and an extension 26 which protrudes toward the floor of the vehicle. The extension 26 is provided with a slot 28 onto which the other end of the belt 10 is secured. Also, the moving plate 24 has four axles 30 which are provided so as to be mutually parallel. On each of the axles 30, as shown in FIG. 4, is provided wheels 32 whose diameter at the center is smaller than the diameter at the edge. The wheels 32, as shown in FIG. 4, ride within a guide wheel 34 which is C-shaped in cross section and may be moved along the axis of the guide rail 34, that is forward and backward along the vehicle.

The guide rail 34 is fastened by several fastening screws 36 through the central part of the C-shaped cross section to the inside of roof side member 20 and the open part is arranged so as to face toward the inside of the vehicle.

The top of guide rail 34 is formed into a flange 38 and the flange 38 is attached by fastening screws 44 to flange 42 which is provided on slide rail 40. Accordingly, guide rail 34 and slide rail 40 are kept parallel. The central part of slide rail 40 is provided with a rectangular groove 46 along its axis and midway down the rectangular groove 46, slide grooves 48 widen the width of the groove 46. A thick tape 50, shown in FIG. 5, is provided in the slide grooves 48 and can slide along the long axis of the slide rail 40.

The thick tape 50, as shown in FIG. 5, is a rectangular cross section and many holes are provided in the thick tape 50 at uniform intervals. Also, the rectangular cross section of the thick tape 50 is a tight fit in the slide grooves 48 of the slide rail 40 when inserted such that while an extension force is naturally transmitted, a compression force can also be transmitted. Furthermore, it is desirable that the material of the tape 50 be made from a synthetic resin with an appropriate flexibility so that the tape 50 may be bent with a small radius of curvature. One end of the tape 50 is fastened by four rivets 52 to a sliding block 54.

Projection 56 of sliding block 54 disengageably engages with projection 58 of movable plate 24 which projects in the direction of the thick tape 50 from the rear. Furthermore, when sliding block 54 is moved toward the front of the vehicle by thick tape 50, the movable plate 24 which has the projection 58 is also caused to move toward the front of the vehicle. In contrast, movable plate 24 may move toward the rear of vehicle by itself. By this means, when a passenger wearing the belt 10 changes his driving position, the movable plate 24 unwinds the narrow belt 62 and moves toward the front of the vehicle thereby increasing the passenger's freedom. Also, if the passenger grabs the belt 10 causing the outer end 16 to move while the outer end 16 is being moved by the thick tape 50 or when the passenger's body is being moved around during an accident, truck 18 can separate from sliding block 54 to prevent damage to the parts of the mechanism.

The end of movable plate 24 at the rear of the motor vehicle has a slot 60 provided in it and one end of a narrow belt 62 is secured to this slot 60. The other end of the narrow belt 62 is wound on roller 68 of winding roller 66 which is held by a fastening bolt 64 to a roof side member 20 at the rear end of guide rail 34. The winding roller 66 is a winding roller of construction similar to winding roller or retractor 14 onto which the inner end 12 of belt 10 is wound. Furthermore, the winding roller 66 is provided with a well known emergency locking retractor for preventing extension of the belt 62 during a vehicular emergency. Under normal circumstances belt 62 is wound up by a spring-powered winder 70. Thus, movable plate 24 which is connected by belt 62 to winding rollers 66 is pulled toward the rear of the vehicle by the force of the spring winder 70. In a vehicular emergency, by movement of the inertia locking device, a pawl can engage ratchet wheel 71 which is fastened to roller 68 to prevent the belt 62 from unwinding. Accordingly, the outer end 16 of the passenger restrictive belt 10 is effectively fastened to the roof side member 20.

Figure 6:
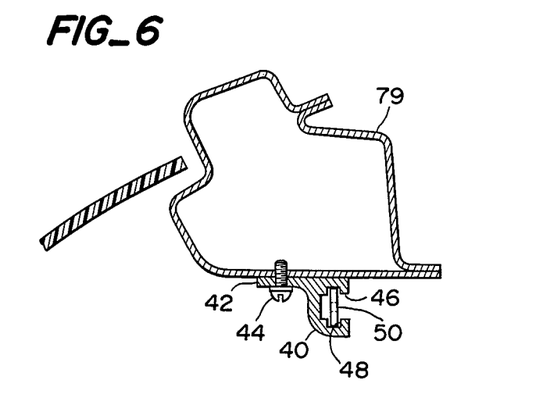
FIG. 6 is a cross sectional along the line VI—VI of FIG. 1.
Figure 7:
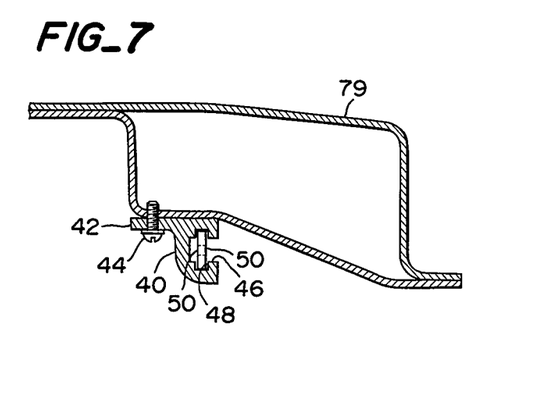
FIG. 7 is a cross sectional along the line VII—VII in FIG. 1.
Figure 10:
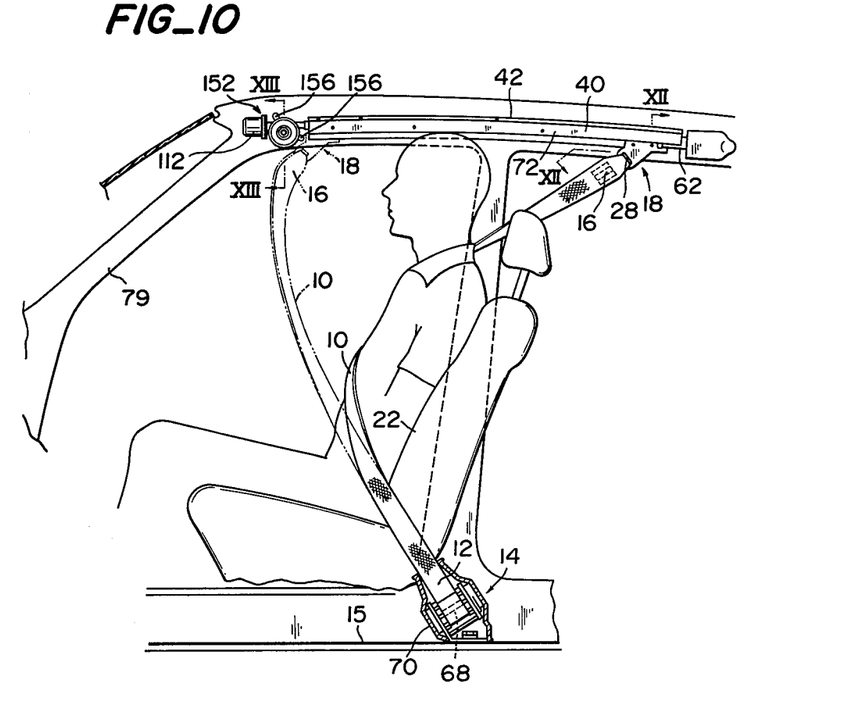
FIG. 10 is a side view showing a second embodiment of a passive seatbelt system in accordance with the teachings of the present invention.

From the slide rail 40, as shown in FIG. 4, in a direction opposite to flange 42, that is toward the floor of the vehicle, is provided another flange 72 and the interior roof lining 74 is held by fastening screws 75 to the flange 72. The guide rail 40 is, as shown in FIGS. 6 and 7 held with fastening screws 44 to the inner side of the vehicular front pillar 79 and descends along this front pillar 79. The lower end of the slide rail 40 is, as shown in FIG. 8, fastened to a sprocket housing 82. The sprocket housing 82, as shown in FIG. 9, is fastened to the center pillar 79 by fastening screws 106. The holes 51 of the thick tape 50 engage with the sprocket wheel 84 and are guided through a groove receiver portion provided in the sprocket housing 82. The sprocket wheel 84 is rotated by a reversible motor 112 such that the thick tape 50, which is held by sprocket 84, is caused to move along its long axis. The motor 112 is arranged such that when the passenger door is opened, it turns counterclockwise in FIG. 8; and when the door is closed it turns clockwise. In each instance, the motor 112 turns a fixed predetermined number of revolutions.

In operation, initially in FIG. 1 the passenger is shown in the vehicle equipped with belt 10 in the operational position. Truck 18 has moved as far as possible to the rear of the vehicle along the guide rail 34 and the passenger is held in by the belt 10. Since the inner end 12 of the webbing 10 is held by winding roller or retractor 14 and the outer end 16 is coupled to movable plate 24 and narrow belt 62 and each of these move, the passenger may freely alter his seated position. When the movable plate 24 moves toward the front of the vehicle, projection 58 separates from projection 56 and thick tape 50 does not move.

When a vehicular emergency such as a collision occurs, the inertia locking devices within rollers 14 and 66 completely stop the unwinding of belt 10 and narrow belt 62. Accordingly whatever position truck 18 and belt 10 are in, the outer end 16 of belt 10 is held at that position to the roof side member 20 and the passenger is restrained and his safety is guaranteed.

Now, when the passenger begins to leave the vehicle and opens the door, motor 112, rotating in a counterclockwise direction in FIG. 1, turns sprocket wheel 84 to pull thick tape 50 and moves the tape 50 in the direction indicated by arrow A. The result is that sliding block 54 moves truck 18 along guide rail 34 toward the front of the vehicle. Therefore, the outer end 16 of the belt 10 moves substantially toward the front of the vehicle to a position shown by the dotted lines in the Figures. Next, when the passenger has reboarded the vehicle, after seating himself and closing the door, motor 112 reverses and exerts a compressive force on the thick tape 50 moving it in a direction opposite to that given by arrow A. As a result, sliding block 54 moves toward the winding rollers 66 and the winding rollers 66 exerts a force on the narrow belt 62 which is attached to truck 18 and moves it toward the rear of the vehicle. By this means, the belt fastened condition of FIG. 1 may be achieved.

From the above description, it is apparent that since the truck 18 follows the movement of the body of the passenger and its stopping point is fixed by the sliding block 56, the extent of the unwinding of the narrow belt 62 from the winding rollers 66 changes with the passenger's body movements and that no matter how far the narrow belt 62 has extended from the winding roller 66, as long as the inertia locking device can still operate, this system can still restrain the passenger in a vehicular emergency.

Figure 11:
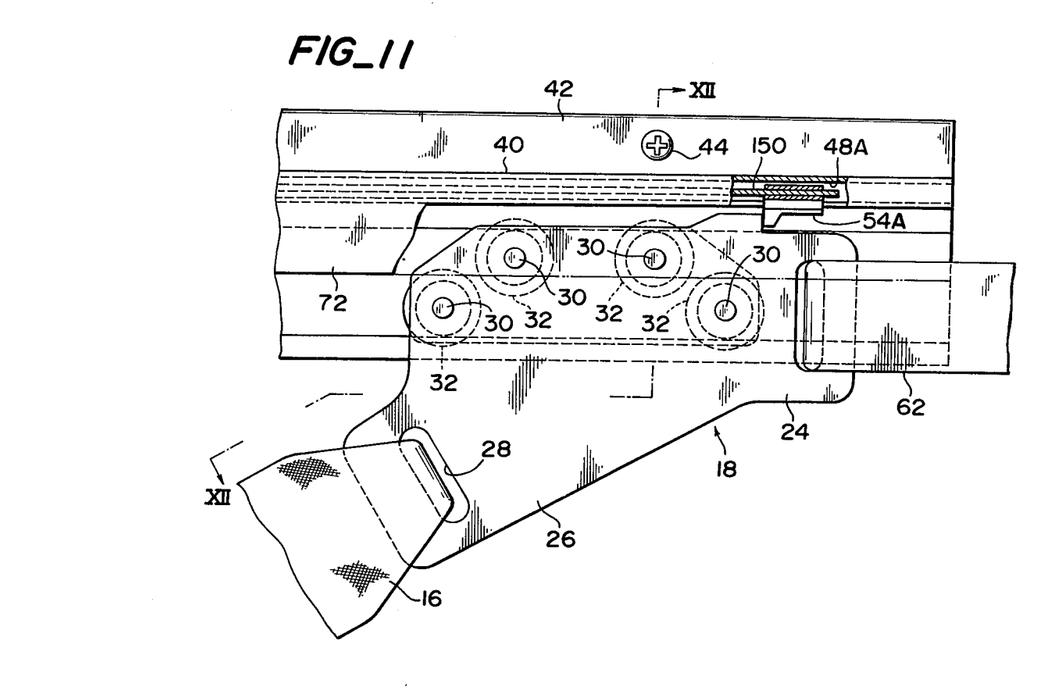
FIG. 11 is an expanded view of part of FIG. 10.
Figures 12, 13:
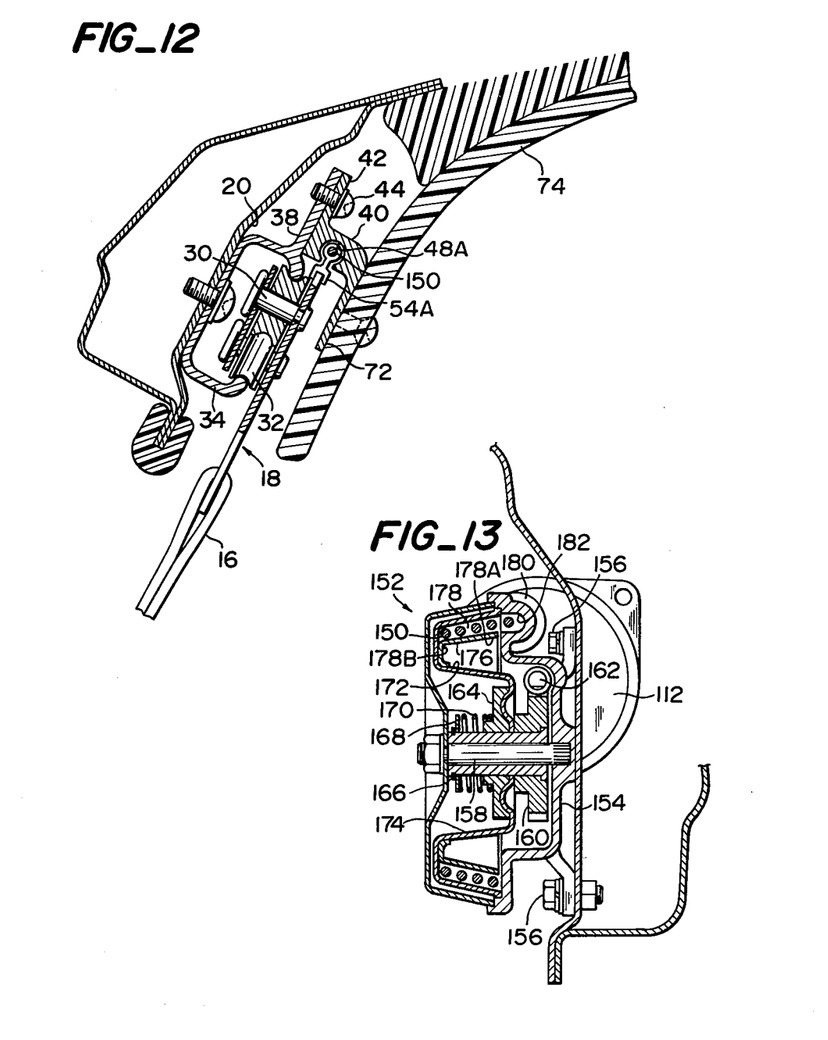
FIG. 12 is a cross sectional view along the line XII—XII of FIG. 10.
FIG. 13 is a cross sectional view along the line XIII—XIII of FIG. 10.

Referring now to FIGS. 10 through 13, shown therein is a second embodiment of a passive seatbelt system in accordance with the teachings of the present invention. This example differs from the previous example in that a wire 150 is used to transmit the pulling force of the motor 112 to the truck 18 instead of the wide tape 50. This wire 150 is naturally capable of transmitting a tensile force along its axis but also may transmit a compressive force. One end is, as shown in FIGS. 11 and 12, clamped to sliding block 54A, while the middle portion is inserted into a slide groove 48A of almost circular cross-section which is provided in slide rail 40 and the wire 150 moves in this slide groove 48A.

The other end of wire 150 is wound onto a wire capstan 152 which is fastened to roof side member 20 at the front end of guide rail 34. The wire capstan 152 has, as shown in FIG. 13, a dish-shaped base 154 which is fastend to roof side member 20 by fastening bolt 156 and axle 156 is provided in the center of the base 154. A worm wheel 160 is provided on the axle 158 and engages with worm 162 mounted on the base 154. The worm 162 is rotated by a motor 112 which is fastened by a bracket (not shown) to roof side member 20. Also, on the axle 158 is provided a circular pressure plate 164 and a pressure coil spring 170 is fitted between the circular pressure plate 164 and a ring 168 which is in turn secured by a C-ring 166. Furthermore, the pressure plate 164 is pressed against worm wheel 160 by a spring 170 and is thus caused by friction to turn with worm wheel 160.

A thin rotatable plate 174, containing a circumferential groove of U-shaped cross-section is fastened to pressure plate 164. The bottom of the circumferential groove 172 is fastened one side of capstan 176 and the space between groove 162 and the outer edge rotatable plate 174 is formed into a wire receiver 178 of tapered cross-section. Here a U-shaped wire guide 180 is formed in base 154. Wire groove 182, adjacent wire guide 180, matches the greatest diameter 178A of circular wire receiver 178 and wire receiver 178 communicates with slide groove 48A of slide rail 40. One end of wire 150 is fastend to capstan 176 at its smallest diameter 178B.

In this construction, capstan 176 is rotated by motor 112. Winding wire 150 on the point of smallest diameter 178B pulls sliding block 54 toward the front of the vehicle when motor 112 is normally operated. When motor 112 is reversed, wire 150 is unwound from the point of greatest diameter and compression of wire 150 causes sliding block 54 to move to the rear of the vehicle. The remainder of the elements of this second embodiment are similar to those described above and are given like reference numerals and the description of their operation and interconnection is omitted.

From the above description, it is apparent that with the present invention, it is possible to provide a passive seatbelt fastening device which can be used with passengers of different physiques and provide freedom of movement for the passengers.

It should be apprent to one skilled in the art that the above described embodiments are merely illustrative but a few of the many possible specific embodiments which represent the application of the principles of the present invention. Numerous and varied other arrangements can be readily devised by those skilled in the art without departing from the spirit and scope of the invention.

I claim:

1. A passive seatbelt device which automatically fastens a restrictive belt about a seated passenger and releases it when the passenger gets in or out of the vehicle comprising:

a guide rail fastened to the roof side of a vehicle longitudinally along the body;

a movable truck, movable along the guide rail and to which is fastened an outer end of the passenger-restrictive belt;

a winding roller fastened at the center of the vehicle such that it winds up the inner end of said belt containing an emergency locking device which stops unwinding of the belt in a vehicular emergency;

a narrow belt fastened to one end of said truck;

a winding roller fastened onto a roof side of said vehicle rearwardly of said guide rail for winding up said narrow belt and containing means which stops the unwinding of the narrow belt in a vehicular emergency; and means for moving said truck towards the front of the vehicle when the passenger gets in or out of the vehicle, said means comprising a sliding block which engages with the truck from the rear of the vehicle whereby the truck may move separately from the sliding block towards the front of the vehicle and a means for moving said sliding block.

2. The passive seatbelt device of claim 1 wherein said truck consists of a movable plate to which is fastened the passenger-restrictive belt and the narrow belt and a plurality of wheels are mounted on the truck which ride on and are guided by said guide rail.

3. The passive seatbelt device of claim 1 wherein said moving means comprises flexible tape.

4. The passive seatbelt device of claim 3 wherein said flexible tape is provided with a plurality of holes along its length, and said moving means further comprises a sprocket wheel rotated by a rotating means, said sprocket wheel engaging with said plurality of holes.

5. The passive seatbelt device of claim 4 wherein said flexible tape is guided by a slide rail fastened to the guide rail.

6. The passive seatbelt device of claim 3 wherein said sliding block is fastened to said flexible tape, and said truck engages with the sliding block.

7. The passive seatbelt device of claim 1 wherein said moving means comprises a wire for transmitting both compression and tension.

8. The passive seatbelt device of claim 7 wherein said moving means further comprises a sliding block fastened to one end of said wire, said sliding block engaging said truck from the rear of the vehicle, and the truck may move separately from the sliding block toward the front of the vehicle.

* * * * *